US012223309B2

(12) United States Patent
Rao Krishnagi et al.

(10) Patent No.: US 12,223,309 B2
(45) Date of Patent: *Feb. 11, 2025

(54) SYSTEM AND METHOD FOR IMPLEMENTING A PLATFORM AND LANGUAGE AGNOSTIC SMART SDK UPGRADE MODULE

(71) Applicant: JPMorgan Chase Bank, N.A., New York, NY (US)

(72) Inventors: Kumar Rao Krishnagi, Powell, OH (US); Matthew J Porter, Mechanicsburg, OH (US); Mark Alan Wells, Columbus, OH (US); Jerome Joseph, Lewis Center, OH (US); Sharmila Prakash, Columbus, OH (US); Satvika Eda, Warangal (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,196

(22) Filed: Jul. 7, 2023

(65) Prior Publication Data

US 2023/0350665 A1 Nov. 2, 2023

Related U.S. Application Data

(63) Continuation of application No. 17/456,970, filed on Nov. 30, 2021, now Pat. No. 11,740,890.

(30) Foreign Application Priority Data

Oct. 18, 2021 (IN) .............................. 202111047061

(51) Int. Cl.
*G06F 8/65* (2018.01)
*G06F 8/30* (2018.01)
(Continued)

(52) U.S. Cl.
CPC .................. *G06F 8/65* (2013.01); *G06F 8/31* (2013.01); *G06F 8/443* (2013.01); *G06N 20/00* (2019.01)

(58) Field of Classification Search
CPC .. G06F 8/65; G06F 8/31; G06F 8/443; G06N 20/00
See application file for complete search history.

(56) References Cited

U.S. PATENT DOCUMENTS 10,503,905 B1 * 12/2019 Misra ........................ G06F 21/64
2020/0019393 A1 * 1/2020 Vichare ................... G06N 20/00
(Continued)

FOREIGN PATENT DOCUMENTS

| CN | 109254914 | | 1/2019 |
|----|-----------|---|--------|
| CN | 109254914 A | * | 1/2019 |

(Continued)

*Primary Examiner* — Daxin Wu
(74) *Attorney, Agent, or Firm* — GREENBLUM & BERNSTEIN, P.L.C.

(57) ABSTRACT

Various methods, apparatuses/systems, and media for automatically upgrading an application are disclosed. A processor creates a dynamic machine learning (ML) model; trains the dynamic ML model and scans for SDK upgrade for the application against the dynamic ML model by implementing ML algorithm for predictions. The processor executes the SDK upgrade in response to detecting that the training of the dynamic ML model is completed to trigger the processor to perform the following automated processes: implement the ML algorithm against the trained dynamic ML model to generate predictive results data for deprecated reference corresponding to the application; evaluate the predictive results data to determine whether there is a match for the deprecated reference; and when it is determined that there is a match for the deprecated reference, automatically replace code and upgrade the application to newer version of the programming language specification.

20 Claims, 9 Drawing Sheets

(51) Int. Cl.
*G06F 8/41* (2018.01)
*G06N 20/00* (2019.01)

(56) References Cited

U.S. PATENT DOCUMENTS

2020/0409780 A1* 12/2020 Balasubramanian ........................ G06F 9/3838
2021/0056007 A1* 2/2021 Viswanathan ...... G06F 11/3688

FOREIGN PATENT DOCUMENTS

CN   115310582      11/2022
CN   115310582 A  * 11/2022

* cited by examiner

SYSTEM AND METHOD FOR IMPLEMENTING A PLATFORM AND LANGUAGE AGNOSTIC SMART SDK UPGRADE MODULE

CROSS-REFERENCE TO RELATED APPLICATIONS

This application is a Continuation of U.S. patent application Ser. No. 17/456,970, filed Nov. 30, 2021, which claims the benefit of priority from Indian Provisional Patent Application No. 202111047061, filed Oct. 18, 2021, each of which is incorporated herein by reference in its entirety.

TECHNICAL FIELD

This disclosure generally relates to upgrading an application, and, more particularly, to methods and apparatuses for implementing a platform and language agnostic smart SDK (Software Development Kit) upgrade module for creating a plug and play automation tool configured for automatically upgrading applications to newer versions of programming language specification.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

As software application becomes increasingly more complex, upgrading such software application to newer versions of programming language specification may also become more complex. Due to the rapid development of Internet applications, the SDK of a client application based on operating systems, e.g., IOS and Android, may need frequent upgrades to meet the needs of users and to provide a better user experience. For example, programming language may often upgrade in a way that is not backwards compatible with software that runs on the previous version. An example of this is the upgrade from Java 8 to Java 11 or higher. With large code bases it may prove to be difficult and often impractical to do the upgrade, resulting in these applications missing out on security fixes and support.

Therefore, there is a need in the industry to automatically upgrade such software application to newer versions of programming language specification that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a platform and language agnostic smart SDK upgrade module for creating a plug and play automation tool configured for automatically upgrading applications to newer versions of programming language specification, thereby removing the overhead of manual research and upgrade, reducing or eliminating human work hours involved which will translate in cost savings, but the disclosure is not limited thereto.

For example, the various aspects, embodiments, features, and/or sub-components may also provide optimized processes of implementing a platform and language agnostic smart SDK upgrade module that is configured to: automatically provide seamless integration with legacy or vendor applications; enable every application to take advantage of security fixes that are only available in new version of language; allow common framework to be used by all applications based on the model built using machine learning algorithms; reduce cost by not requiring extended support models from vendors; speed up any strategic initiatives for any given application, e.g., data center migration and saves development hours for each application, etc., but the disclosure is not limited thereto.

The configuration/data files, according to exemplary embodiments, may be written using JSON, but the disclosure is not limited thereto. For example, the configuration/data files can easily be extended to other readable file formats such as XML, YAML, etc., or any other configuration based languages.

According to an aspect of the present disclosure, a method for automatically upgrading an application by utilizing one or more processors along with allocated memory is disclosed. The method may include: creating a dynamic machine learning (ML) model to be utilized in upgrading an application to a newer version of a programming language specification; training the dynamic ML model; scanning for SDK upgrade for the application against the dynamic ML model by implementing ML algorithm for predictions; detecting whether training of the dynamic ML model is completed or not; executing the SDK upgrade in response to detecting that the training of the dynamic ML model is completed to trigger the following automated processes: implementing the ML algorithm against the trained dynamic ML model to generate predictive results data for deprecated reference corresponding to the application; evaluating the predictive results data to determine whether there is a match for the deprecated reference; and when it is determined that there is a match for the deprecated reference, automatically replacing code and upgrading the application to the newer version of the programming language specification.

According to yet another aspect of the instant disclosure, when it is determined that there is no match for the deprecated reference, the method may further include: recursively adding pattern or structure to the dynamic ML model for future analysis.

According to a further aspect of the instant disclosure, the deprecated reference may include application programming interface (API), tools, dependency patterns, and their respective equivalent replacements or alternative for upgrading the application, but the disclosure is not limited thereto.

According to an additional aspect of the instant disclosure, in training the dynamic ML model, the method may further include training the dynamic ML model in a supervised manner that includes training the dynamic ML model with known deprecated API, tools, dependency patterns and their respective equivalent replacements or alternatives for upgrading the application.

According to yet another aspect of the instant disclosure, in training the dynamic ML model, the method may further include: training the dynamic ML model in an unsupervised manner that includes, while the dynamic ML model is being utilized for predictive analysis, recursively adding any unknown patterns to the dynamic ML model without any alternatives.

According to yet another aspect of the instant disclosure, when the application is a legacy application, the method may further include: including the SDK to the application as a dependency, wherein the SDK acts as a wrapper around implementation for the deprecated reference; creating a map that links between older modules and newer SDK modules corresponding to the application; storing the map within the dynamic ML model; and updating the legacy application by parsing existing project and utilizing the dynamic ML model.

According to another aspect of the instant disclosure, a system for automatically upgrading an application is disclosed. The system may include: a processor; and a memory operatively connected to the processor via a communication interface, the memory storing computer readable instructions, when executed, may cause the processor to: create a dynamic machine learning (ML) model to be utilized in upgrading an application to a newer version of a programming language specification; train the dynamic ML model; scan for SDK upgrade for the application against the dynamic ML model by implementing ML algorithm for predictions; detect whether training of the dynamic ML model is completed or not; execute the SDK upgrade in response to detecting that the training of the dynamic ML model is completed to further cause the processor to perform the following automated processes: implement the ML algorithm against the trained dynamic ML model to generate predictive results data for deprecated reference corresponding to the application; evaluate the predictive results data to determine whether there is a match for the deprecated reference; and when it is determined that there is a match for the deprecated reference, automatically replace code and upgrade the application to the newer version of the programming language specification.

According to yet another aspect of the instant disclosure, when it is determined that there is no match for the deprecated reference, the processor may be further configured to: recursively add pattern or structure to the dynamic ML model for future analysis.

According to a further aspect of the instant disclosure, in training the dynamic ML model, the processor may be further configured to: train the dynamic ML model in a supervised manner that includes training the dynamic ML model with known deprecated API, tools, dependency patterns and their respective equivalent replacements or alternatives for upgrading the application.

According to yet another aspect of the instant disclosure, in training the dynamic ML model, the processor may be further configured to: train the dynamic ML model in an unsupervised manner that includes, while the dynamic ML model is being utilized for predictive analysis, recursively add any unknown patterns to the dynamic ML model without any alternatives.

According to a further aspect of the present disclosure, when the application is a legacy application, the processor may be further configured to: include the SDK to the application as a dependency, wherein the SDK acts as a wrapper around implementation for the deprecated reference; create a map that links between older modules and newer SDK modules corresponding to the application; store the map within the dynamic ML model; and update the legacy application by parsing existing project and utilize the dynamic ML model.

According to yet another aspect of the present disclosure, a non-transitory computer readable medium configured to store instructions for automatically upgrading an application is disclosed. The instructions, when executed, may cause a processor to perform the following: creating a dynamic machine learning (ML) model to be utilized in upgrading an application to a newer version of a programming language specification; training the dynamic ML model; scanning for SDK upgrade for the application against the dynamic ML model by implementing ML algorithm for predictions; detecting whether training of the dynamic ML model is completed or not; executing the SDK upgrade in response to detecting that the training of the dynamic ML model is completed to trigger the following automated processes: implementing the ML algorithm against the trained dynamic ML model to generate predictive results data for deprecated reference corresponding to the application; evaluating the predictive results data to determine whether there is a match for the deprecated reference; and when it is determined that there is a match for the deprecated reference, automatically replacing code and upgrading the application to the newer version of the programming language specification.

According to another aspect of the instant disclosure, when it is determined that there is no match for the deprecated reference, the instructions, when executed, may further cause the processor to perform the following: recursively adding pattern or structure to the dynamic ML model for future analysis.

According to an additional aspect of the instant disclosure, in training the dynamic ML model, the instructions, when executed, may further cause the processor to perform the following: training the dynamic ML model in a supervised manner that includes training the dynamic ML model with known deprecated API, tools, dependency patterns and their respective equivalent replacements or alternatives for upgrading the application.

According to yet another aspect of the instant disclosure, in training the dynamic ML model, the instructions, when executed, may further cause the processor to perform the following: training the dynamic ML model in an unsupervised manner that includes, while the dynamic ML model is being utilized for predictive analysis, recursively adding any unknown patterns to the dynamic ML model without any alternatives.

According to yet another aspect of the instant disclosure, when the application is a legacy application, the instructions, when executed, may further cause the processor to perform the following: including the SDK to the application as a dependency, wherein the SDK acts as a wrapper around implementation for the deprecated reference; creating a map that links between older modules and newer SDK modules corresponding to the application; storing the map within the dynamic ML model; and updating the legacy application by parsing existing project and utilizing the dynamic ML model.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
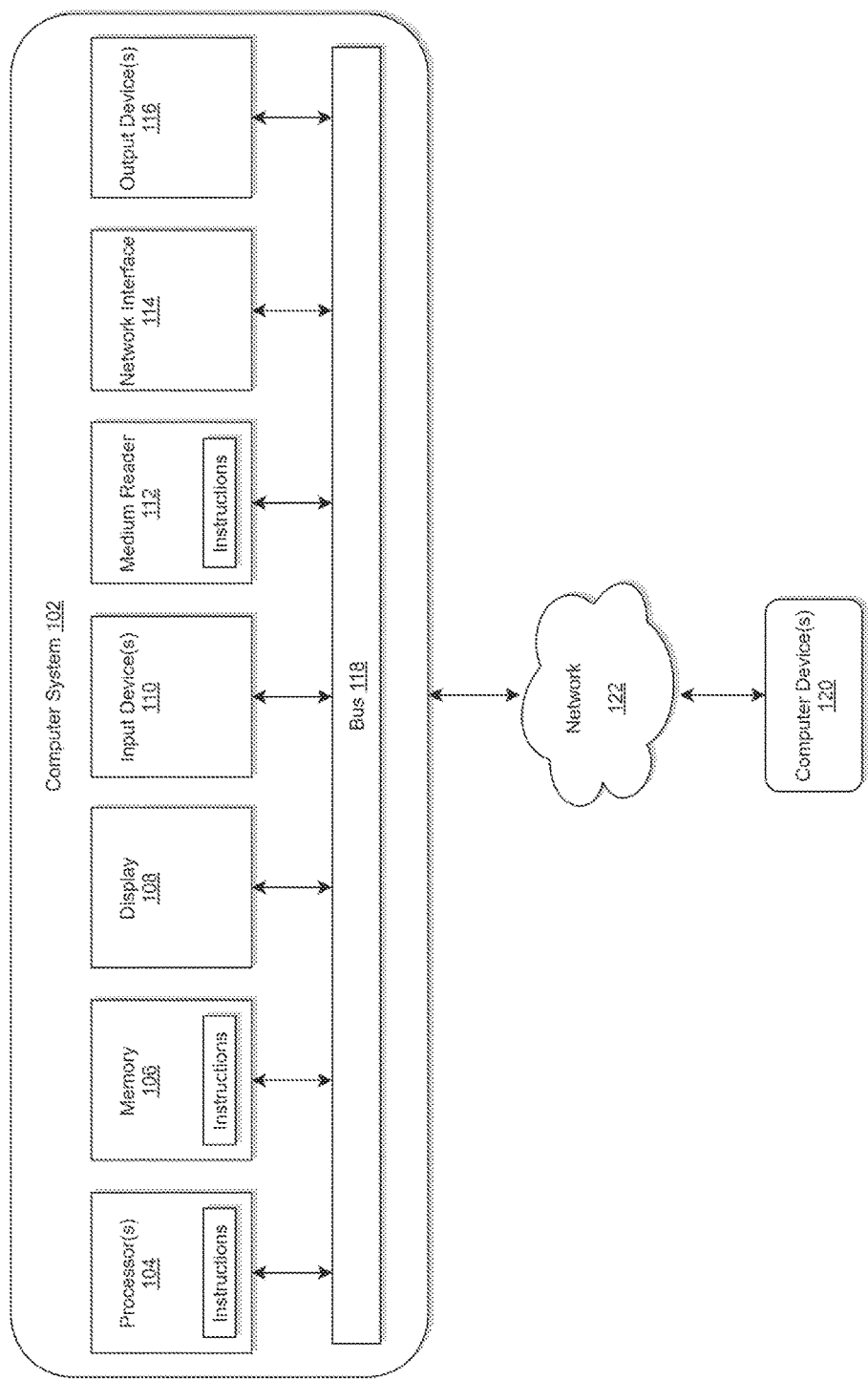
FIG. 1 illustrates a computer system for implementing a platform and language agnostic smart SDK upgrade module for creating a plug and play automation tool configured for automatically upgrading applications to newer versions of programming language specification in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a platform and language agnostic smart SDK upgrade module for creating a plug and play automation tool configured for automatically upgrading applications to newer versions of programming language specification in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, bluray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
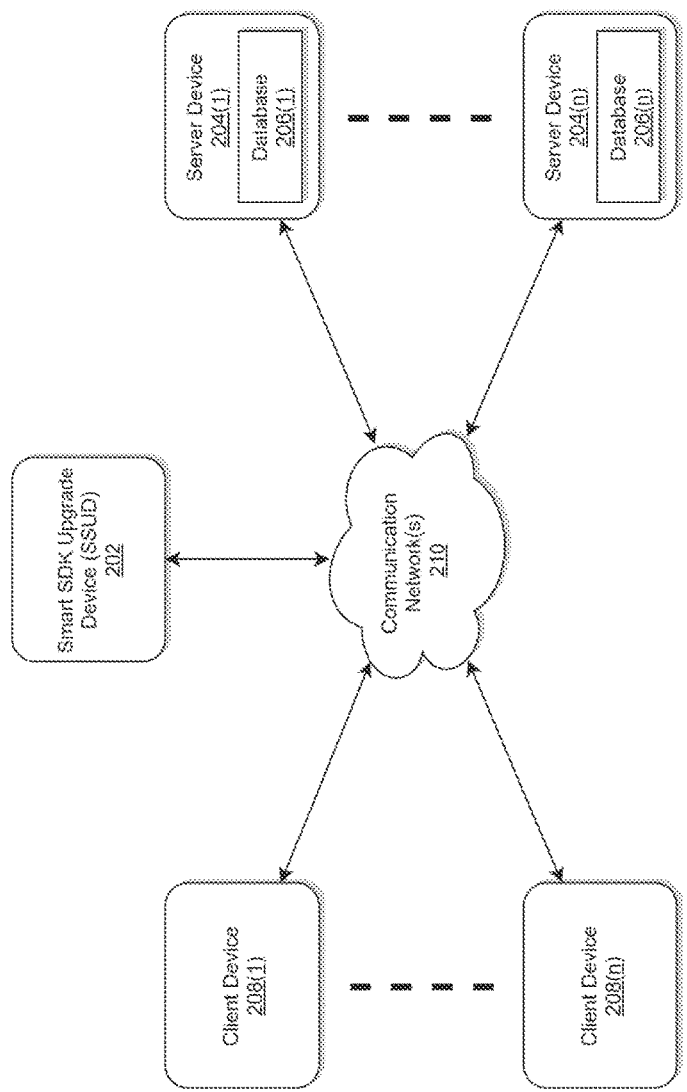
FIG. 2 illustrates an exemplary diagram of a network environment with a platform and language agnostic smart SDK upgrade device in accordance with an exemplary embodiment.

Referring to FIG. 2, a schematic of an exemplary network environment 200 for implementing a platform and language agnostic smart SDK upgrade device (SSUD) of the instant disclosure is illustrated.

According to exemplary embodiments, the above-described problems associated with conventional approach of upgrading software application may be overcome by implementing a SSUD 202 as illustrated in FIG. 2 that may create a plug and play automation tool configured for automatically upgrading applications to newer versions of programming language specification, thereby removing the overhead of manual research and upgrade, reducing or eliminating human work hours involved which will translate in cost savings, but the disclosure is not limited thereto. For example, the SSUD 202 may also provide optimized processes to automatically provide seamless integration with legacy or vendor applications; enable every application to take advantage of security fixes that are only available in new version of language; allow common framework to be used by all applications based on the model built using machine learning algorithms; reduce cost by not requiring extended support models from vendors; speed up any strategic initiatives for any give application, e.g., data center migration and saves development hours for each application, etc., but the disclosure is not limited thereto.

The SSUD 202 may be the same or similar to the computer system 102 as described with respect to FIG. 1.

The SSUD 202 may store one or more applications that can include executable instructions that, when executed by the SSUD 202, cause the SSUD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SSUD 202 itself, may be located in virtual server(s) running in a cloud-based computing environment rather than being tied to one or more specific physical network computing devices. Also, the application(s) may be running in one or more virtual machines (VMs) executing on the SSUD 202. Additionally, in one or more embodiments of this technology, virtual machine(s) running on the SSUD 202 may be managed or supervised by a hypervisor.

In the network environment 200 of FIG. 2, the SSUD 202 is coupled to a plurality of server devices 204(1)-204(n) that hosts a plurality of databases 206(1)-206(n), and also to a plurality of client devices 208(1)-208(n) via communication network(s) 210. A communication interface of the SSUD 202, such as the network interface 114 of the computer system 102 of FIG. 1, operatively couples and communicates between the SSUD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SSUD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SSUD 202 may be a standalone device or integrated with one or more other devices or apparatuses, such as one or more of the server devices 204(1)-204(n), for example. In one particular example, the SSUD 202 may be hosted by one of the server devices 204(1)-204(n), and other arrangements are also possible. Moreover, one or more of the devices of the SSUD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SSUD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(t)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SSUD 202 that may efficiently provide a platform for creating a plug and play automation tool configured for automatically upgrading applications to newer versions of programming language specification, thereby removing the overhead of manual research and upgrade, reducing or eliminating human work hours involved which will translate in cost savings, but the disclosure is not limited thereto. For example, the client devices 208(1)-208(n) in this example may include any type of computing device that can facilitate the implementation of the SSUD 202 that may be configured to automatically provide seamless integration with legacy or vendor applications; enable every application to take advantage of security fixes that are only available in new version of language; allow common framework to be used by all applications based on the model built using machine learning algorithms; reduce cost by not requiring extended support models from vendors; speed up any strategic initiatives for any give application, e.g., data center migration and saves development hours for each application, etc., but the disclosure is not limited thereto.

The client devices 208(1)-208(n) may run interface applications, such as standard web browsers or standalone client applications, which may provide an interface to communicate with the SSUD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SSUD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SSUD 202, the server devices 204(1)-204(n), or the client devices 208(1)-208(n), for example, may be configured to operate as virtual instances on the same physical machine. For example, one or more of the SSUD 202, the server devices 204(1)-204(n), or the client devices 208(1)-208(n) may operate on the same physical device rather than as separate devices communicating through communication network(s) 210. Additionally, there may be more or fewer SSUDs 202, server devices 204(1)-204(n), or client devices 208(1)-208(n) than illustrated in FIG. 2. According to exemplary embodiments, the SSUD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
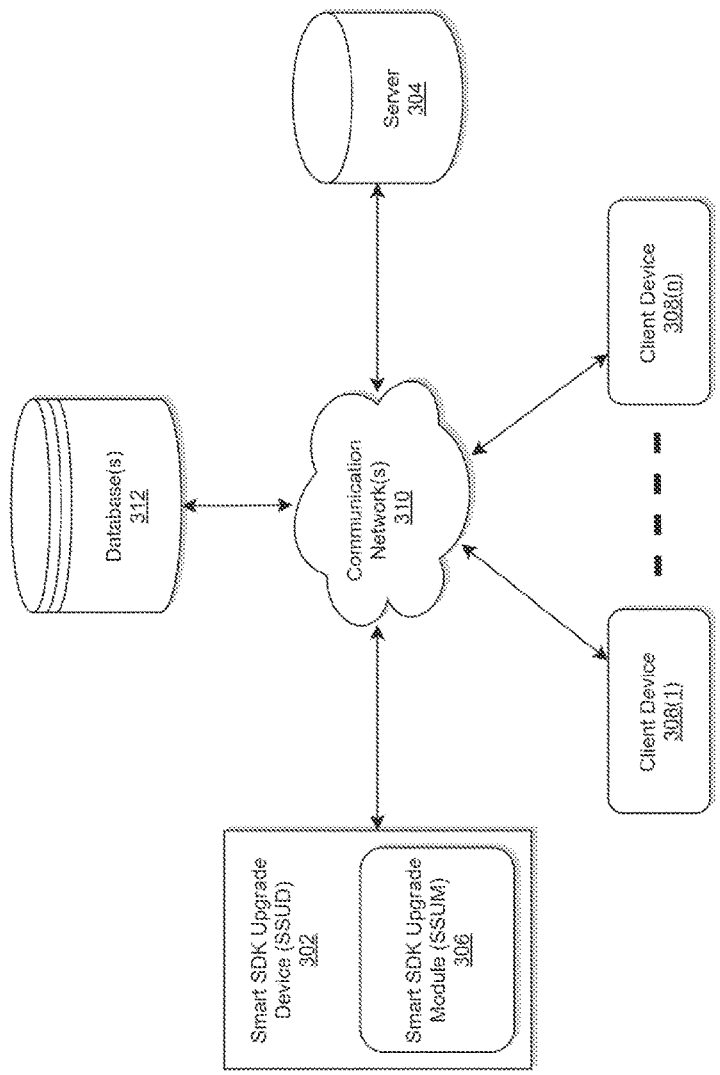
FIG. 3 illustrates a system diagram for implementing a platform and language agnostic smart SDK upgrade device having a platform and language agnostic smart SDK upgrade module in accordance with an exemplary embodiment.

FIG. 3 illustrates a system diagram for implementing a platform and language agnostic smart SDK upgrade device (SSUD) having a platform and language agnostic smart SDK upgrade module (SSUM) in accordance with an exemplary embodiment.

As illustrated in FIG. 3, the system 300 may include a SSUD 302 within which a SSUM 306 is embedded, a server 304, a database(s) 312, a plurality of client devices 308(1) . . . 308(n), and a communication network 310.

According to exemplary embodiments, the SSUD 302 including the SSUM 306 may be connected to the server 304, and the database(s) 312 via the communication network 310. The SSUD 302 may also be connected to the plurality of client devices 308(1) . . . 308(n) via the communication network 310, but the disclosure is not limited thereto.

According to exemplary embodiment, the SSUD 302 is described and shown in FIG. 3 as including the SSUM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein.

According to exemplary embodiments, the SSUM 306 may be configured to receive real-time feed of data from the plurality of client devices 308(1) . . . 308(n) via the communication network 310.

As will be described below, the SSUM 306 may be configured to create a dynamic machine learning (ML) model to be utilized in upgrading an application to a newer version of a programming language specification; train the dynamic ML model; scan for SDK upgrade for the application against the dynamic ML model by implementing ML algorithm for predictions; detect whether training of the dynamic ML model is completed or not; execute the SDK upgrade in response to detecting that the training of the dynamic ML model is completed to further cause the processor to perform the following automated processes: implement the ML algorithm against the trained dynamic ML model to generate predictive results data for deprecated reference corresponding to the application; evaluate the predictive results data to determine whether there is a match for the deprecated reference; and when it is determined that there is a match for the deprecated reference, automatically replace code and upgrading the application to the newer version of the programming language specification, but the disclosure is not limited thereto.

The plurality of client devices 308(1) . . . 308(n) are illustrated as being in communication with the SSUD 302.

In this regard, the plurality of client devices 308(1) . . . 308(n) may be "clients" of the SSUD 302 and are described herein as such. Nevertheless, it is to be known and understood that the plurality of client devices 308(1) . . . 308(n) need not necessarily be "clients" of the SSUD 302, or any entity described in association therewith herein. Any additional or alternative relationship may exist between either or both of the plurality of client devices 308(1) . . . 308(n) and the SSUD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the SSUD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The SSUD 302 may be the same or similar to the SSUD 202 as described with respect to FIG. 2, including any features or combination of features described with respect thereto.

Figure 4:
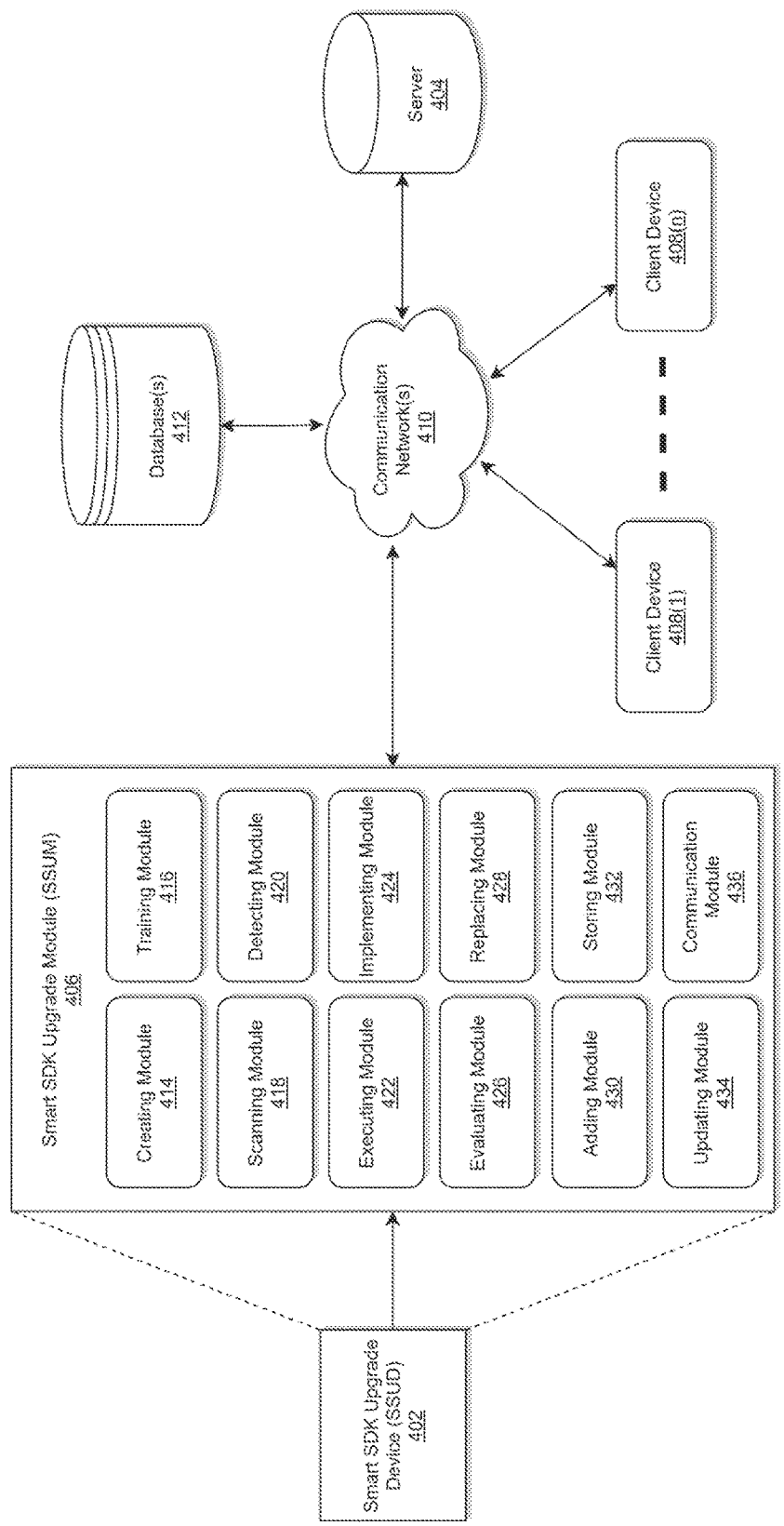
FIG. 4 illustrates a system diagram for implementing a platform and language agnostic smart SDK upgrade module of FIG. 3 in accordance with an exemplary embodiment.

FIG. 4 illustrates a system diagram for implementing a platform and language agnostic smart SDK module (SSUM) of FIG. 3 in accordance with an exemplary embodiment.

According to exemplary embodiments, the system 400 may include a platform and language agnostic smart SDK device (SSUD) 402 within which a SSUM 406 is embedded, a server 404, database(s) 412, and a communication network 410.

According to exemplary embodiments, the SSUD 402 including the SSUM 406 may be connected to the server 404 and the database(s) 412 via the communication network 410. The SSUD 402 may also be connected to the plurality of client devices 408(1)-408(n) via the communication network 410, but the disclosure is not limited thereto. The SSUM 406, the server 404, the plurality of client devices 408(1)-408(n), the database(s) 412, the communication network 410 as illustrated in FIG. 4 may be the same or similar to the SSUM 306, the server 304, the plurality of client devices 308(1)-308(n), the database(s) 312, the communication network 310, respectively, as illustrated in FIG. 3.

According to exemplary embodiments, as illustrated in FIG. 4, the SSUM 406 may include a creating module 414, a training module 416, a scanning module 418, a detecting module 420, an executing module 422, an implementing module 424, an evaluating module 426, a replacing module 428, an adding module 430, a storing module 432, an updating module 434, and a communication module 436.

According to exemplary embodiments, each of the creating module 414, training module 416, scanning module 418, detecting module 420, executing module 422, implementing module 424, evaluating module 426, replacing module 428, adding module 430, storing module 432, updating module 434, and the communication module 436 of the SSUM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the creating module 414, training module 416, scanning module 418, detecting module 420, executing module 422, implementing module 424, evaluating module 426, replacing module 428, adding module 430, storing module 432, updating module 434, and the communication module 436 of the SSUM 406 may be implemented by microprocessors or similar, and may be programmed using software (e.g., microcode) to perform various functions discussed herein and may optionally be driven by firmware and/or software.

Alternatively, according to exemplary embodiments, each of the creating module 414, training module 416, scanning module 418, detecting module 420, executing module 422, implementing module 424, evaluating module 426, replacing module 428, adding module 430, storing module 432, updating module 434, and the communication module 436 of the SSUM 406 may be implemented by dedicated hardware, or as a combination of dedicated hardware to perform some functions and a processor (e.g., one or more programmed microprocessors and associated circuitry) to perform other functions.

According to exemplary embodiments, each of the creating module 414, training module 416, scanning module 418, detecting module 420, executing module 422, implementing module 424, evaluating module 426, replacing module 428, adding module 430, storing module 432, updating module 434, and the communication module 436 of the SSUM 406 may be called via corresponding API.

The process may be executed via the communication module 436 and the communication network 410, which may comprise plural networks as described above. For example, in an exemplary embodiment, the various components of the SSUM 406 may communicate with the server 404, and the database(s) 412 via the communication module 436 and the communication network 410. Of course, these embodiments are merely exemplary and are not limiting or exhaustive.

According to exemplary embodiments, the communication network 410 and the communication module 436 may be configured to establish a link between the database(s) 412, the client devices 408(1)-408(n) and the SSUM 406, 506.

According to exemplary embodiments, the creating module 414 may be configured to create a dynamic machine learning (ML) model to be utilized in upgrading an application to a newer version of a programming language specification.

According to exemplary embodiments, the training module 416 may be configured to train the dynamic ML model.

According to exemplary embodiments, the scanning module 418 may be configured to scan for smart SDK upgrade for the application against the dynamic ML model by implementing ML algorithm for predictions.

According to exemplary embodiments, the detecting module 420 may be configured to detect whether training of the dynamic ML model is completed or not. The executing module 422 may be configured to execute the smart SDK upgrade in response to detecting that the training of the dynamic ML model is completed to further cause the SSUM 406 to perform the following automated processes by utilizing the implementing module 424, evaluating module 426, replacing module 428, adding module 430, storing module 432 and the updating module 434. For example, the implementing module 424 may be configured to implement the ML algorithm against the trained dynamic ML model to generate predictive results data for deprecated reference corresponding to the application. The evaluating module 426 may be configured to evaluate the predictive results data to determine whether there is a match for the deprecated reference. When it is determined that there is a match for the deprecated reference, the replacing module 428 may be configured to automatically replace code and upgrade the application to the newer version of the programming language specification.

According to exemplary embodiments, when it is determined that there is no match for the deprecated reference, the adding module 430 may be configured to recursively add pattern or structure to the dynamic ML model for future analysis.

According to exemplary embodiments, the deprecated reference may include APIs, tools, dependency patterns, and their respective equivalent replacements or alternative for upgrading the application, but the disclosure is not limited thereto.

According to exemplary embodiments, in training the dynamic ML model, the training module 416 may be configured to train the dynamic ML model in a supervised manner that includes training the dynamic ML model with known deprecated APIs, tools, dependency patterns and their respective equivalent replacements or alternatives for upgrading the application. For example, in supervised learning, the dynamic ML model may receive input and output data (e.g., classification, regression, etc., but the disclosure is not limited thereto) and generate predictions and predictive models.

According to exemplary embodiments, in training the dynamic ML model, the training module 416 may be further configured to train the dynamic ML model in an unsupervised manner that includes, while the dynamic ML model is being utilized for predictive analysis, recursively add any unknown patterns to the dynamic ML model without any alternatives. For example, in unsupervised learning, the dynamic ML model may receive only input data (e.g., clustering, association, etc., but the disclosure is no limited thereto) and generate pattern/structure discovery.

According to exemplary embodiments, user review of the dynamic ML model for any unknown patterns following an upgrade scan may be performed for model fine tuning, i.e., it can be researched quickly and trained with appropriate solutions eliminating too many user interventions during the upgrade itself.

Figure 5:
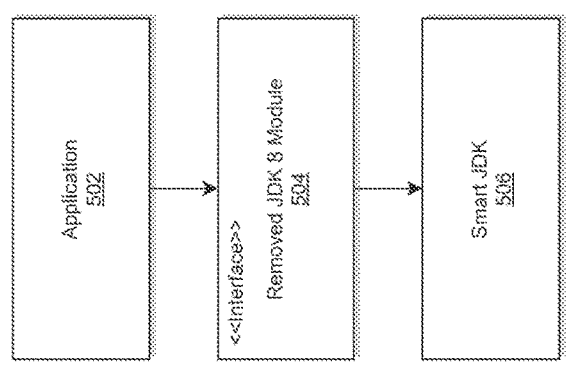
FIG. 5 illustrates an exemplary smart SDK upgrade architecture implemented by the platform and language agnostic smart SDK upgrade module of FIG. 4 for a first use in accordance with an exemplary embodiment.

FIG. 5 illustrates an exemplary smart SDK upgrade architecture 500 implemented by the platform and language agnostic smart SDK upgrade module of FIG. 4 for a first use in accordance with an exemplary embodiment.

For example, according to exemplary embodiments, when the application 502 is a legacy application, the SSUM 406 may be further configured to include the smart SDK to the application as a dependency, wherein the SDK acts as a wrapper around implementation for the deprecated reference. The creating module 414 may be configured to create a map that links between older modules and newer SDK modules corresponding to the application 502. The storing module 432 may be configured to store the map within the dynamic ML model. The updating module 434 may be configured to update the legacy application 502 by parsing existing project and utilizing the dynamic ML model.

FIG. 5 illustrates an exemplary smart JDK architecture 500 implemented by the SSUM 406 of FIG. 4 in accordance with an exemplary embodiment that includes Java language example, but the disclosure is not limited thereto. SSUM 406 may be utilized for any other programming language also.

In this exemplary embodiment as illustrated in FIG. 5, client applications 502 would include the smart JDK (Java Development Kit) 506 as a dependency. The smart JDK 506 would follow the same contract as the removed modules or classes in JDK 8 module 504, allowing clients to call these modules with no or minimum code changes. In this use case, smart JDK acts as a wrapper around the proper implementation for the deprecated modules. The mapping between the old modules and new smart JDK modules would live in the knowledge base (i.e., the dynamic ML model). The smart Java upgrade process would parse the existing project and use the knowledge base to update the project. For example, JDK 8 may support an encoder class sun.misc.BASE64Encoder.encode( ). However, in JDK 11, such class may be deprecated. According to exemplary embodiments, the SSUM 406 may be configured to automatically address this issue and upgrade the application for JDK 11 class by replacing sun.misc.BASE64Encoder.encode( ) with Java.util.Base64.encode( ).

Figure 6:
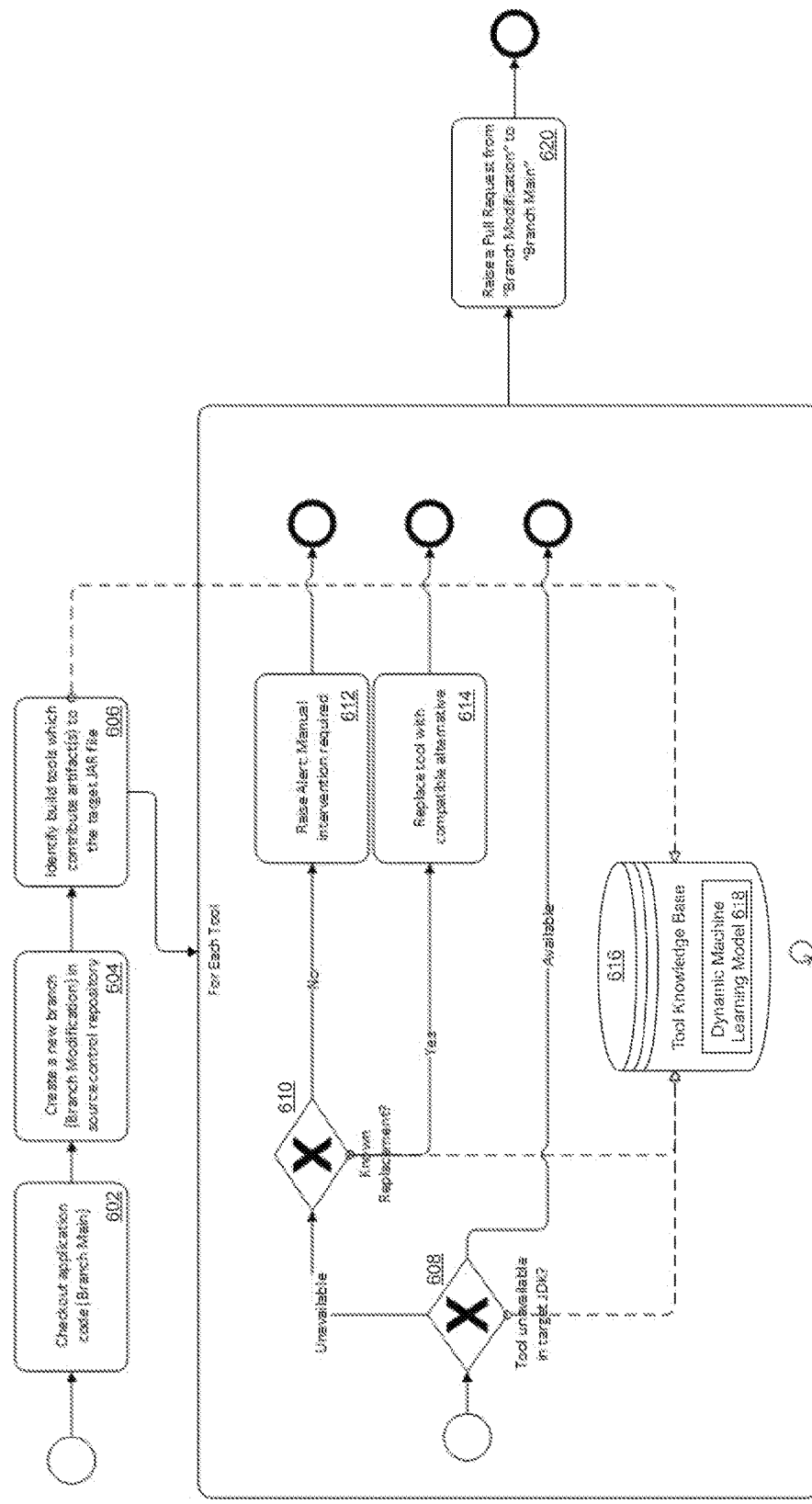
FIG. 6 illustrates an exemplary smart SDK upgrade architecture implemented by the platform and language agnostic smart SDK upgrade module of FIG. 4 for a second use in accordance with an exemplary embodiment.
Figure 7:
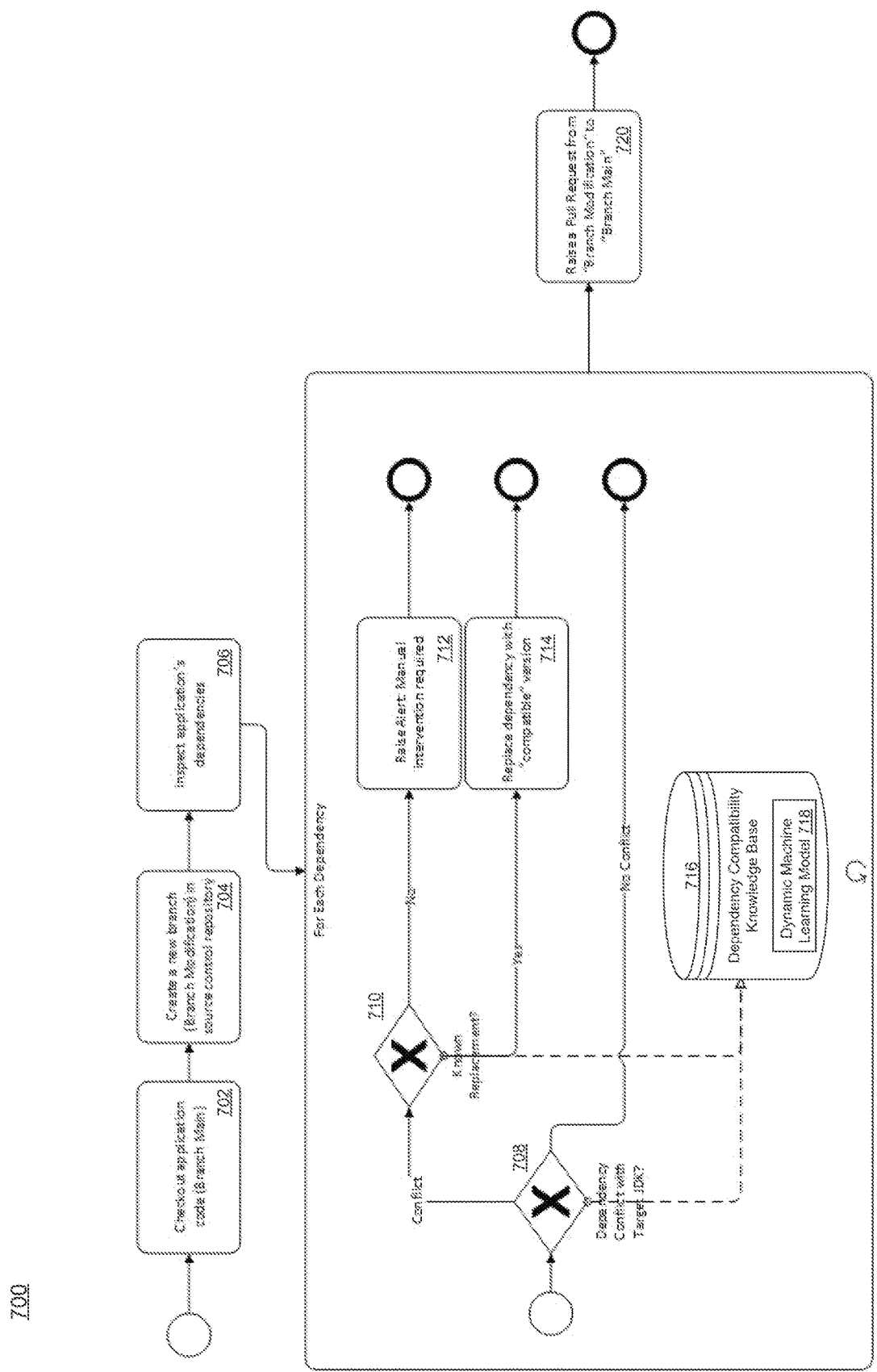
FIG. 7 illustrates an exemplary smart SDK upgrade architecture implemented by the platform and language agnostic smart SDK upgrade module of FIG. 4 for a third use in accordance with an exemplary embodiment.
Figure 8:
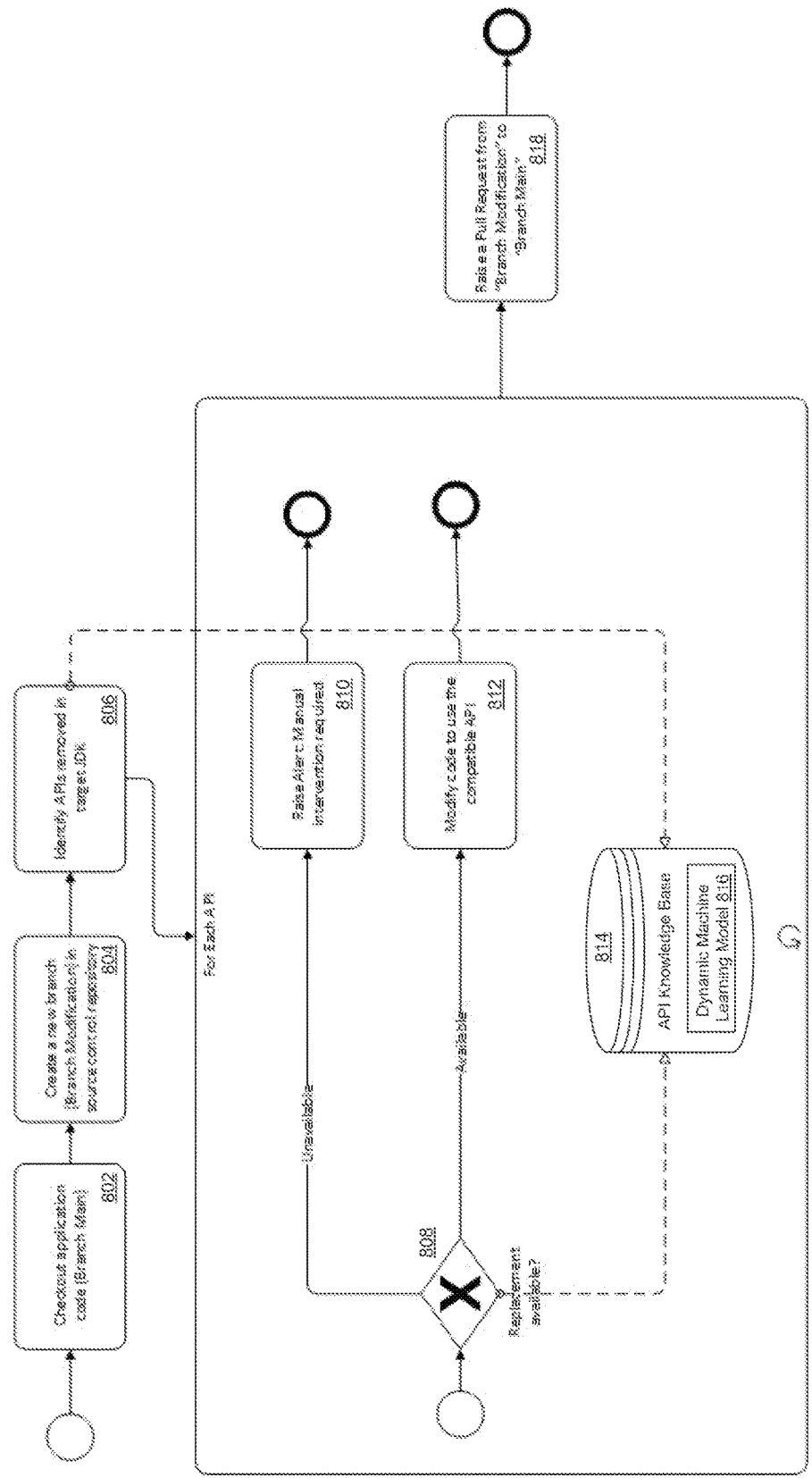
FIG. 8 illustrates an exemplary smart SDK upgrade architecture implemented by the platform and language agnostic smart SDK upgrade module of FIG. 4 for a fourth use in accordance with an exemplary embodiment.

FIG. 6 illustrates an exemplary smart SDK upgrade architecture 600 implemented by the platform and language agnostic SSUM 406 of FIG. 4 for a second use in accordance with an exemplary embodiment. FIG. 7 illustrates an exemplary smart SDK upgrade architecture 700 implemented by the platform and language agnostic SSUM 406 of FIG. 4 for a third use in accordance with an exemplary embodiment. FIG. 8 illustrates an exemplary smart SDK upgrade architecture 800 implemented by the platform and language agnostic SSUM 406 of FIG. 4 for a fourth use in accordance with an exemplary embodiment.

Although the examples in FIG. 6, FIG. 7, and FIG. 8 are illustrated using Java language, the disclosure is not limited thereto. The disclosed processes can be utilized for any other programming languages as well.

FIG. 6 illustrates high level workflow for tools. For example, at block 602, the SSUM 406 may checkout the application code (branch main). At block 604, the SSUM 406 may create new branch (branch modification) in source control repository (i.e., database 412 as illustrated in FIG. 4). At block 606, the SSUM 406 may identify build tools which contribute artifact(s) to a target JAR file, but the disclosure is not limited to JAR file format. Any other desired file format would be applicable without departing from the scope of the present disclosure. For each tool, at decision block 608, the SSUM 406 determines whether tool is unavailable in target JDK by comparing with the tool knowledge base 616 which includes the dynamic ML model 618 disclosed above with respect to FIG. 4. If it is determined that tool is available, the process moves to block 620 where the SSUM 406 raises a pull request from "branch modification" to "branch main." However, if it is determined that tool is unavailable, at the decision block 610, the SSUM 406 determines whether known replacement is available or not. If it is determined that known replacement is not available, the SSUM 406 raises alert for manual intervention at block 612, and the process moves to block 620 where the SSUM 406 raises a pull request from "branch modification" to "branch main." However, if it is determined that known replacement is available, the SSUM 406 replaces tools with compatible alternative at block 614, and the process moves to block 620 where the SSUM 406 raises a pull request from "branch modification" to "branch main."

FIG. 7 illustrates high level workflow for JAR files. For example, at block 702, the SSUM 406 may checkout the application code (branch main). At block 704, the SSUM 406 may create new branch (branch modification) in source control repository (i.e., database 412 as illustrated in FIG. 4). At block 706, the SSUM 406 may inspect application dependencies. For each dependency, at decision block 708, the SSUM 406 determines whether dependency conflict with target JDK by comparing with the dependency compatibility knowledge base 716 which includes the dynamic ML model 718 disclosed above with respect to FIG. 4. If it is determined that there is no conflict, the process moves to block 720 where the SSUM 406 raises a pull request from "branch modification" to "branch main." However, if it is determined that there is a conflict, at the decision block 710, the SSUM 406 determines whether known replacement is available or not. If it is determined that known replacement is not available, the SSUM 406 raises alert for manual intervention at block 712, and the process moves to block 720 where the SSUM 406 raises a pull request from "branch modification" to "branch main." However, if it is determined that known replacement is available, the SSUM 406 replaces dependency with compatible version at block 714, and the process moves to block 720 where the SSUM 406 raises a pull request from "branch modification" to "branch main."

FIG. 8 illustrates high level workflow for APIs. For example, at block 802, the SSUM 406 may checkout the application code (branch main). At block 804, the SSUM 406 may create new branch (branch modification) in source control repository (i.e., database 412 as illustrated in FIG. 4). At block 806, the SSUM 406 may identify APIs removed in target JDK. For each API, at decision block 808, the SSUM 406 determines whether replacement is available by comparing with the API knowledge base 814 which includes the dynamic ML model 816 disclosed above with respect to FIG. 4. If it is determined that replacement is available, the SSUM 406 modifies code to use the compatible API at block 812, and the process moves to block 818 where the SSUM 406 raises a pull request from "branch modification" to "branch main." However, if it is determined that replacement is not available, at the decision block 810, the SSUM 406 raises alert for manual intervention, and the process moves to block 818 where the SSUM 406 raises a pull request from "branch modification" to "branch main."

Figure 9:
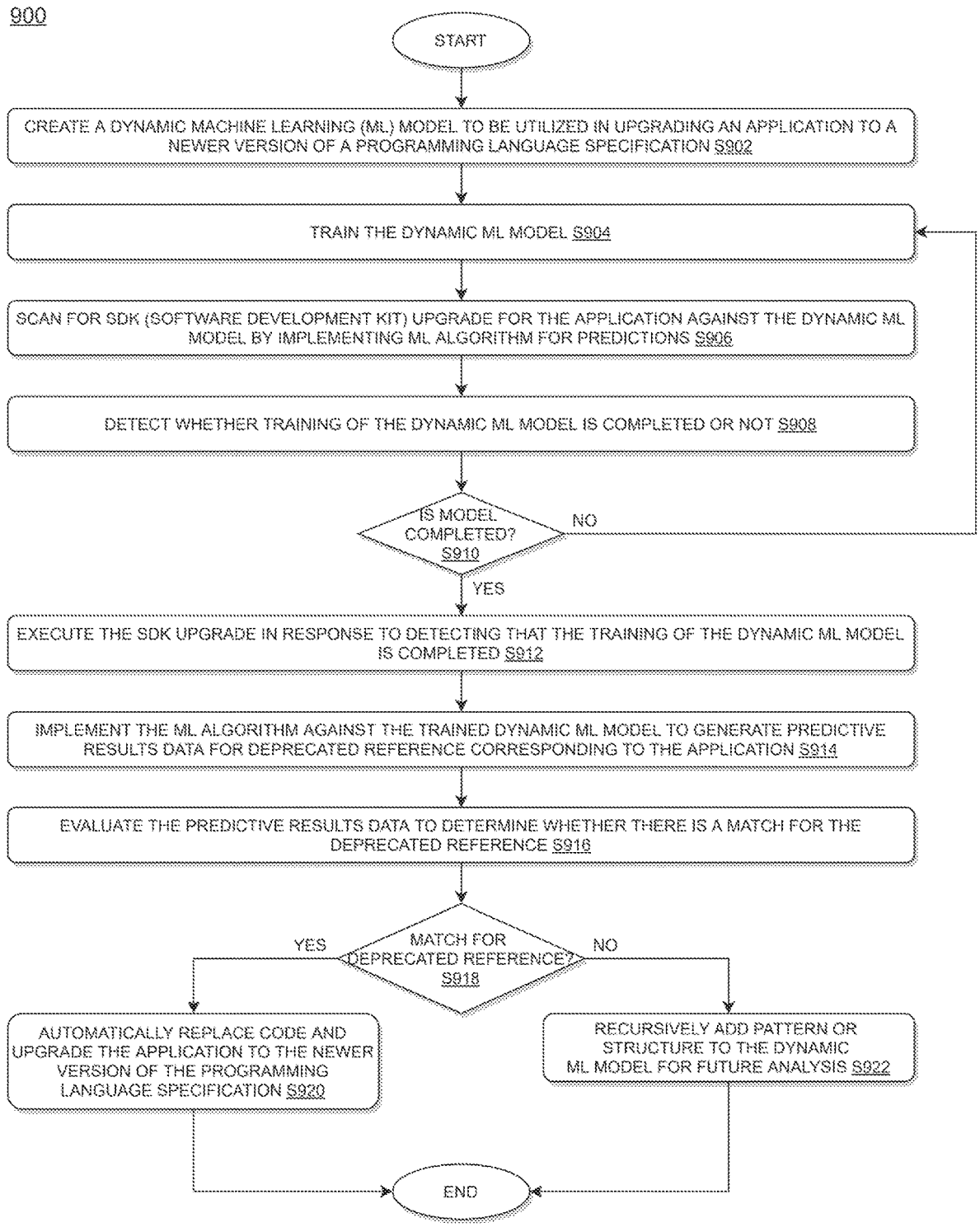
FIG. 9 illustrates a flow chart for implementing a platform and language agnostic smart SDK upgrade module for creating a plug and play automation tool configured for automatically upgrading applications to newer versions of programming language specification in accordance with an exemplary embodiment.

FIG. 9 illustrates a flow chart of a process 900 for implementing a platform and language agnostic smart SDK upgrade module for creating a plug and play automation tool configured for automatically upgrading applications to newer versions of programming language specification in accordance with an exemplary embodiment. It will be appreciated that the illustrated process 900 and associated steps may be performed in a different order, with illustrated steps omitted, with additional steps added, or with a combination of reordered, combined, omitted, or additional steps.

As illustrated in FIG. 9, at step S902, the process 900 may include creating a dynamic machine learning (ML) model to be utilized in upgrading an application to a newer version of a programming language specification.

At step S904, the process 900 may include training the dynamic ML model.

At step S906, the process 900 may include scanning for SDK upgrade for the application against the dynamic ML model by implementing ML algorithm for predictions.

At step S908, the process 900 may include detecting whether training of the dynamic ML model is completed or not.

When at step S910 the process 900 determines that the training of the dynamic ML model is completed, at step S912, the process 900 may include executing the SDK upgrade which may include the following automated processes that includes steps S914, S916. S918, S920, and S922. And when at step S910 the process 900 determines that the training of the dynamic ML model is not completed, the process 900 may go back to step S904 to continue train the dynamic ML model.

At step S914, the process 900 may include implementing the ML algorithm against the trained dynamic ML model to generate predictive results data for deprecated reference corresponding to the application.

At step S916, the process 900 may include evaluating the predictive results data to determine whether there is a match for the deprecated reference.

At step S918, when the process 900 determines that there is a match for the deprecated reference, at step S920, the process 900 may include automatically replacing code and upgrading the application to the newer version of the programming language specification.

At step S918, when the process 900 determines that there is no match for the deprecated reference, at step S922, the process 900 may include recursively adding pattern or structure to the dynamic ML model for future analysis.

According to exemplary embodiments, in training the dynamic ML model, the process 900 may further include training the dynamic ML model in a supervised manner that includes training the dynamic ML model with known deprecated APIs, tools, dependency patterns and their respective equivalent replacements or alternatives for upgrading the application.

According to exemplary embodiments, in training the dynamic ML model, the process 900 may further include: training the dynamic ML model in an unsupervised manner that includes, while the dynamic ML model is being utilized for predictive analysis, recursively adding any unknown patterns to the dynamic ML model without any alternatives.

According to exemplary embodiments, when the application is a legacy application, the process 900 may further include: including the SDK to the application as a dependency, wherein the SDK acts as a wrapper around implementation for the deprecated reference; creating a map that links between older modules and newer SDK modules corresponding to the application; storing the map within the dynamic ML model; and updating the legacy application by parsing existing project and utilizing the dynamic ML model.

According to exemplary embodiments, the SSUD 402 may include a memory (e.g., a memory 106 as illustrated in FIG. 1) which may be a non-transitory computer readable medium that may be configured to store instructions for implementing a SSUM 406 for creating a plug and play automation tool configured for automatically upgrading applications to newer versions of programming language specification process as disclosed herein. The SSUD 402 may also include a medium reader (e.g., a medium reader 112 as illustrated in FIG. 1) which may be configured to read any one or more sets of instructions, e.g., software, from any of the memories described herein. The instructions, when executed by a processor embedded within the SSUM 406, 506 or within the SSUD 402, may be used to perform one or more of the methods and processes as described herein. In a particular embodiment, the instructions may reside completely, or at least partially, within the memory 106, the medium reader 112, and/or the processor 104 (see FIG. 1) during execution by the SSUD 402.

According to exemplary embodiments, the instructions, when executed, may cause a processor embedded within the SSUM 406 or the SSUD 402 to perform the following: creating a dynamic machine learning (ML) model to be utilized in upgrading an application to a newer version of a programming language specification; training the dynamic ML model; scanning for SDK (Software Development Kit) upgrade for the application against the dynamic ML model by implementing ML algorithm for predictions; detecting whether training of the dynamic ML model is completed or not; executing the SDK upgrade in response to detecting that the training of the dynamic ML model is completed to trigger the following automated processes: implementing the ML algorithm against the trained dynamic ML model to generate predictive results data for deprecated reference corresponding to the application; evaluating the predictive results data to determine whether there is a match for the deprecated reference; and when it is determined that there is a match for the deprecated reference, automatically replacing code and upgrading the application to the newer version of the programming language specification. The processor may be the same or similar to the processor 104 as illustrated in FIG. 1 or the processor embedded within SSUD 202, SSUD 302, SSUD 402, and SSUM 406.

According to exemplary embodiments, when it is determined that there is no match for the deprecated reference, the instructions, when executed, may further cause the processor 104 to perform the following: recursively adding pattern or structure to the dynamic ML model for future analysis.

According to exemplary embodiments, in training the dynamic ML model, the instructions, when executed, may further cause the processor 104 to perform the following: training the dynamic ML model in a supervised manner that includes training the dynamic ML model with known deprecated API, tools, dependency patterns and their respective equivalent replacements or alternatives for upgrading the application.

According to exemplary embodiments, in training the dynamic ML model, the instructions, when executed, may further cause the processor 104 to perform the following: training the dynamic ML model in an unsupervised manner that includes, while the dynamic ML model is being utilized for predictive analysis, recursively adding any unknown patterns to the dynamic ML model without any alternatives.

According to exemplary embodiments, when the application is a legacy application, the instructions, when executed, may further cause the processor 104 to perform the following: including the SDK to the application as a dependency, wherein the SDK acts as a wrapper around implementation for the deprecated reference; creating a map that links between older modules and newer SDK modules corresponding to the application; storing the map within the dynamic ML model; and updating the legacy application by parsing existing project and utilizing the dynamic ML model According to exemplary embodiments as disclosed above in FIGS. 1-9, technical improvements effected by the instant disclosure may include a platform for implementing a platform and language agnostic smart SDK upgrade module for creating a plug and play automation tool configured for automatically upgrading applications to newer versions of programming language specification, thereby removing the overhead of manual research and upgrade, reducing or eliminating human work hours involved which will translate in cost savings, but the disclosure is not limited thereto.

For example, according to exemplary embodiments as disclosed above in FIGS. 1-9, technical improvements effected by the instant disclosure may include a platform that may also provide optimized processes of implementing a platform and language agnostic smart SDK upgrade module that is configured to: automatically provide seamless integration with legacy or vendor applications; enable every application to take advantage of security fixes that are only available in new version of language; allow common framework to be used by all applications based on the model built using machine learning algorithms; reduce cost by not requiring extended support models from vendors; speed up any strategic initiatives for any give application, e.g., data center migration and saves development hours for each application, etc., but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically upgrading an application by utilizing one or more processors along with allocated memory, the method comprising:

scanning for SDK (Software Development Kit) upgrade for an application against a dynamic machine learning (ML) model by implementing ML algorithm for predictions in upgrading the application to a newer version of a programming language specification;

detecting whether training of the dynamic ML model is completed or not;

executing the SDK upgrade in response to detecting that the training of the dynamic ML model is completed to trigger the following automated processes:

implementing the ML algorithm against the trained dynamic ML model to generate predictive results data for deprecated reference corresponding to the application;

evaluating the predictive results data to determine whether there is a match for the deprecated reference; and when it is determined that there is a match for the deprecated reference, automatically replacing code and upgrading the application to the newer version of the programming language specification.

2. The method according to claim 1, wherein, when it is determined that there is no match for the deprecated reference, the method further comprising:

recursively adding pattern or structure to the dynamic ML model for future analysis.

3. The method according to claim 1, wherein the deprecated reference includes application programming interface (API), tools, dependency patterns, and their respective equivalent replacements or alternative for upgrading the application.

4. The method according to claim 3, wherein training the dynamic ML model further comprising:

training the dynamic ML model in a supervised manner that includes training the dynamic ML model with known deprecated API, tools, dependency patterns and their respective equivalent replacements or alternatives for upgrading the application.

5. The method according to claim 3, wherein training the dynamic ML model further comprising:

training the dynamic ML model in an unsupervised manner that includes, while the dynamic ML model is being utilized for predictive analysis, recursively adding any unknown patterns to the dynamic ML model without any alternatives.

6. The method according to claim 1, wherein, when the application is a legacy application, the method further comprising:

including the SDK to the application as a dependency, wherein the SDK acts as a wrapper around implementation for the deprecated reference.

7. The method according to claim 6, further comprising:

creating a map that links between older modules and newer SDK modules corresponding to the application;

storing the map within the dynamic ML model; and updating the legacy application by parsing existing project and utilizing the dynamic ML model.

8. A system for automatically upgrading an application, the system comprising:

a processor; and a memory operatively connected to the processor via a communication interface, the memory storing computer readable instructions, when executed, causes the processor to:

scan for SDK (Software Development Kit) upgrade for an application against a dynamic machine learning (ML) model by implementing ML algorithm for predictions in upgrading the application to a newer version of a programming language specification;
detect whether training of the dynamic ML model is completed or not;
execute the SDK upgrade in response to detecting that the training of the dynamic ML model is completed to further cause the processor to perform the following automated processes:
  implement the ML algorithm against the trained dynamic ML model to generate predictive results data for deprecated reference corresponding to the application;
  evaluate the predictive results data to determine whether there is a match for the deprecated reference; and
  when it is determined that there is a match for the deprecated reference, automatically replace code and upgrade the application to the newer version of the programming language specification.

9. The system according to claim 8, wherein, when it is determined that there is no match for the deprecated reference, the processor is further configured to:
  recursively add pattern or structure to the dynamic ML model for future analysis.

10. The system according to claim 8, wherein the deprecated reference includes application programming interface (API), tools, dependency patterns, and their respective equivalent replacements or alternative for upgrading the application.

11. The system according to claim 10, wherein in training the dynamic ML model, the processor is further configured to:
  train the dynamic ML model in a supervised manner that includes training the dynamic ML model with known deprecated API, tools, dependency patterns and their respective equivalent replacements or alternatives for upgrading the application.

12. The system according to claim 10, wherein in training the dynamic ML model, the processor is further configured to:
  train the dynamic ML model in an unsupervised manner that includes, while the dynamic ML model is being utilized for predictive analysis, recursively add any unknown patterns to the dynamic ML model without any alternatives.

13. The system according to claim 8, wherein, when the application is a legacy application, the processor is further configured to:
  include the SDK to the application as a dependency, wherein the SDK acts as a wrapper around implementation for the deprecated reference.

14. The system according to claim 13, wherein the processor is further configured to:
  create a map that links between older modules and newer SDK modules corresponding to the application;
  store the map within the dynamic ML model; and
  update the legacy application by parsing existing project and utilize the dynamic ML model.

15. A non-transitory computer readable medium configured to store instructions for automatically upgrading an application, wherein, when executed, the instructions cause a processor to perform the following:
  scanning for SDK (Software Development Kit) upgrade for an application against a dynamic machine learning (ML) model by implementing ML algorithm for predictions in upgrading the application to a newer version of a programming language specification;
  detecting whether training of the dynamic ML model is completed or not;
  executing the SDK upgrade in response to detecting that the training of the dynamic ML model is completed to trigger the following automated processes:
    implementing the ML algorithm against the trained dynamic ML model to generate predictive results data for deprecated reference corresponding to the application;
    evaluating the predictive results data to determine whether there is a match for the deprecated reference; and
    when it is determined that there is a match for the deprecated reference, automatically replacing code and upgrading the application to the newer version of the programming language specification.

16. The non-transitory computer readable medium according to claim 15, wherein, when it is determined that there is no match for the deprecated reference, the instructions, when executed, further cause the processor to perform the following:
  recursively adding pattern or structure to the dynamic ML model for future analysis.

17. The non-transitory computer readable medium according to claim 15, wherein the deprecated reference includes application programming interface (API), tools, dependency patterns, and their respective equivalent replacements or alternative for upgrading the application.

18. The non-transitory computer readable medium according to claim 17, wherein in training the dynamic ML model, the instructions, when executed, further cause the processor to perform the following:
  training the dynamic ML model in a supervised manner that includes training the dynamic ML model with known deprecated API, tools, dependency patterns and their respective equivalent replacements or alternatives for upgrading the application.

19. The non-transitory computer readable medium according to claim 17, wherein in training the dynamic ML model, the instructions, when executed, further cause the processor to perform the following:
  training the dynamic ML model in an unsupervised manner that includes, while the dynamic ML model is being utilized for predictive analysis, recursively adding any unknown patterns to the dynamic ML model without any alternatives.

20. The non-transitory computer readable medium according to claim 15, wherein, when the application is a legacy application, the instructions, when executed, further cause the processor to perform the following:
  including the SDK to the application as a dependency, wherein the SDK acts as a wrapper around implementation for the deprecated reference;
  creating a map that links between older modules and newer SDK modules corresponding to the application;
  storing the map within the dynamic ML model; and
  updating the legacy application by parsing existing project and utilizing the dynamic ML model.

* * * * *